United States Patent
Hartmann et al.

(10) Patent No.: US 11,104,520 B2
(45) Date of Patent: Aug. 31, 2021

(54) METHOD FOR MONITORING AND/OR MAINTAINING A CONVEYOR SYSTEM, AND CONVEYOR SYSTEM

(71) Applicants: Bernd Hartmann, Grafschaft-Leimersdorf (DE); Manfred Krup, Söhlde (DE); Arnd Kraemer, Hildesheim (DE)

(72) Inventors: Bernd Hartmann, Grafschaft-Leimersdorf (DE); Manfred Krup, Söhlde (DE); Arnd Kraemer, Hildesheim (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/864,611

(22) Filed: May 1, 2020

(65) Prior Publication Data

US 2020/0377305 A1  Dec. 3, 2020

(30) Foreign Application Priority Data

May 29, 2019  (DE) ...................... 10 2019 114 469.8

(51) Int. Cl.
  *B65G 43/08*  (2006.01)
  *B65G 43/10*  (2006.01)
  *B65G 43/00*  (2006.01)
(52) U.S. Cl.
  CPC .......... *B65G 43/00* (2013.01); *B65G 2201/02* (2013.01); *B65G 2203/0216* (2013.01); *B65G 2203/0233* (2013.01); *B65G 2203/042* (2013.01)
(58) Field of Classification Search
  CPC ................................ B65G 43/08; B65G 43/10
  (Continued)

(56) References Cited

U.S. PATENT DOCUMENTS 5,273,392 A * 12/1993 Bernard, II .......... B65G 1/1371
 414/807
5,330,062 A *  7/1994 Murphree .............. B65G 1/133
 198/793

(Continued)

FOREIGN PATENT DOCUMENTS

DE  10 2008 020 520 A1  10/2009
DE  10 2015 005 443 A1  12/2016

(Continued)

OTHER PUBLICATIONS

US 2018/0253683, Taylor et al., September 6 (Year: 2018).*

*Primary Examiner* — Douglas A Hess
(74) *Attorney, Agent, or Firm* — Reinhart Boerner Van Deuren P.C.

(57) ABSTRACT

A method for monitoring a conveyor system transporting separated piece goods is disclosed. The conveyor system has a display device extending in sections along a transport path for the piece goods. The display device is designed to display at least one optical signal at different points of the transport path, and the display device is coupled to a control device. The control device determines information relating to the relationship of the actual conveyance of the piece good along the transport path with respect to the predetermined conveyance of the piece good along the transport path. An optical signal running along parallel to a piece good transported along the at least one transport path is displayed by the display device. The optical signal indicates the relationship of the actual conveyance of the piece good with respect to the predetermined conveyance of the piece good.

14 Claims, 7 Drawing Sheets

(58) Field of Classification Search
USPC .......... 198/502.1, 502.3, 617; 700/228, 229, 700/230
See application file for complete search history.

(56) References Cited

U.S. PATENT DOCUMENTS

| | | | | |
|---|---|---|---|---|
| 6,009,991 | A * | 1/2000 | Anderson | B65G 1/1371 |
| | | | | 198/349 |
| 6,085,892 | A * | 7/2000 | Lem | B65G 47/54 |
| | | | | 198/349.6 |
| 6,240,335 | B1 * | 5/2001 | Wehrung | G05B 19/4182 |
| | | | | 700/230 |
| 7,564,349 | B2 * | 7/2009 | Robey | B65G 1/1373 |
| | | | | 221/5 |
| 9,555,966 | B2 * | 1/2017 | Ejima | B65G 17/00 |
| 10,501,269 | B2 * | 12/2019 | Walter | B65G 47/682 |
| 10,577,180 | B1 * | 3/2020 | Mehta | B25J 9/1697 |
| 10,773,898 | B2 * | 9/2020 | Perrot | B65G 47/31 |
| 10,781,053 | B1 * | 9/2020 | Zhao | B65G 21/02 |

FOREIGN PATENT DOCUMENTS

| | | |
|---|---|---|
| DE | 10 2017 206 772 A1 | 10/2018 |
| DE | 20 2018 100 245 U1 | 4/2019 |
| JP | 2007/320722 A | 12/2007 |
| JP | 2014/091609 A | 5/2014 |

* cited by examiner

METHOD FOR MONITORING AND/OR MAINTAINING A CONVEYOR SYSTEM, AND CONVEYOR SYSTEM

CROSS-REFERENCE TO RELATED PATENT APPLICATIONS

This patent application claims the benefit of German Patent Application No. 10 2019 114 469.8, filed May 29, 2019, the entire teachings and disclosure of which are incorporated herein by reference thereto.

FIELD OF THE INVENTION

The invention relates to a method for monitoring and/or maintaining a conveyor system transporting separated piece goods, in particular packages, wherein the conveyor system has a display device extending at least in sections along a transport path for the piece goods, wherein the display device is designed to display at least one optical signal at different points of the at least one transport path, and wherein the display device is coupled to a control device. The invention also relates to a conveyor system for transporting piece goods, in particular packages, wherein the conveyor system has a display device extending at least in sections along a transport path for the piece goods, wherein the display device is designed to display at least one optical signal at different points of the at least one transport path, and wherein the display device is coupled to a control device.

BACKGROUND

Very different conveyor systems and also methods for monitoring and maintaining such conveyor systems are known. In the present case, the conveyor systems are not understood as meaning those for transporting bulk goods, but rather piece goods. Such conveyor systems regularly have belt conveyors, conveyor belts or roller conveyors, for example. In this case, the conveyor systems can be used only to transport the piece goods from one location to another, if necessary. It is then sufficient if the conveyor system has only one transport path along which the piece goods are conveyed in succession and in a separated form. However, it may also be provided that the conveyor system transports different piece goods from a common starting point to different end points. Conveyor systems in which piece goods can be transported from different starting points to different end points in each case are also known. Such conveyor systems have at least two different transport paths and are designed to sort piece goods, if necessary. In particular, conveyor devices having a plurality of transport paths can have significant complexity. In this case, the methods for conveying the piece goods along the different transport paths can be accordingly complex. This is the case, in particular, for conveyor systems along which the piece goods are each transported in a separated form, that is to say in a manner spaced apart from one another in the transport direction, and in succession.

Conveyor systems having display devices which extend at least in sections along at least one transport path of the conveyor system are also known. The display devices are coupled to a control device and, in this manner, are designed to display pieces of information relating to the transport of piece goods. For example, a green light can be used to indicate that the piece goods are being transported in that section of the transport path which is assigned to the light. In contrast, a red light can signal, for example, that congestion has occurred in that section of the transport path which is assigned to the light or the conveyance of piece goods has come to a standstill. The individual displays can also be coupled to individual piece goods, with the result that a signal from the display device is displayed parallel to the transport of a piece good along the display device and therefore along the transport path. The actual transport of the corresponding piece good can therefore be compared with the signals along the display device or the transport path. Depending on the corresponding signal or the signal waveform, it can then be determined whether or not it is necessary to intervene in the conveyor system for the purpose of eliminating a disruption.

In principle, with increasing complexity of the conveyor systems and the methods for operating the latter, an increased availability of the conveyor system is required in order to be able to operate the conveyor systems as economically as possible. It is therefore of interest to monitor the proper function of the conveyor systems in order to be able to detect operational disruptions early and/or to be able to eliminate them quickly. However, it has hitherto been possible to this take interest into account only inadequately, thus resulting again and again in operational disruptions in the conveyor systems which must be eliminated in a time-consuming manner, with the result that the availability of the conveyor systems falls.

BRIEF SUMMARY

The present invention is therefore based on the object of configuring and developing the method and the conveyor system each of the type mentioned at the outset and described in more detail above in such a manner that the availability is increased by virtue of the fact that operational disruptions can be avoided or can at least be eliminated quickly.

This object is achieved by means of a method for monitoring and/or maintaining a conveyor system transporting separated piece goods, in particular packages, wherein the conveyor system has a display device extending at least in sections along a transport path for the piece goods, wherein the display device is designed to display at least one optical signal at different points of the at least one transport path, and wherein the display device is coupled to a control device,
  in which the control device receives and/or determines pieces of information relating to the relationship of the actual conveyance of at least one piece good along the at least one transport path with respect to the predetermined conveyance of the at least one piece good along the at least one transport path,
  in which an optical signal running along parallel to a piece good transported along the at least one transport path is displayed at least in sections by the display device, and
  in which the optical signal running along with the at least one piece good indicates the relationship of the actual conveyance of at least one piece good along the at least one transport path with respect to the predetermined conveyance of the at least one piece good along the at least one transport path depending on the respective actual and/or predetermined location of the at least one piece good.

Said object is also achieved, in the case of a conveyor system in that the conveyor system is designed to carry out a method for monitoring and/or maintenance, in that the control device is designed to receive and/or determine pieces of information relating to the relationship of the actual conveyance of at least one piece good along the at least one transport path with respect to the predetermined conveyance of the at least one piece good along the at least one transport path, in that the display device is designed to display, at least in sections, an optical signal running along parallel to a piece good transported along the at least one transport path, and in that the control device is designed to display the relationship of the actual conveyance of at least one piece good along the at least one transport path with respect to the predetermined conveyance of the least one piece good along the at least one transport path depending on the respective actual and/or predetermined location of the at least one piece good using the optical signal running along with the at least one piece good.

The invention therefore provides that the conveyor system comprises at least one transport path along which the piece goods to be conveyed can be transported. However, with particular preference, it will be routine if the conveyor system has a plurality of transport paths which can preferably also branch. Piece goods can therefore be transported from at least one starting point to different end points. This also allows sorting of the piece goods along the conveyor system on the basis of predetermined criteria. This is the case, for example, when conveying piece goods in the form of packages, but piece goods in the form of packages, that is to say repackaged objects, are very fundamentally preferred. In this case, the piece goods are repackaged, in particular, by means of packets in the form of cartons, films or the like, in which case the packet can vary depending on the repackaged piece good. With further preference, the packages may be parcels or parcel shipments.

A display device is provided at least in sections along at least one transport path and, for the sake of simplicity, can be arranged beside the corresponding transport path. However, the display device may also be at least partially arranged below or above the corresponding transport path. Irrespective of this, the display device will extend, in particular, such that the display device is discernibly assigned to a transport path and different sections of the display device are discernibly assigned to different sections of the transport path. The display device can therefore display an optical signal on different sections of the display device and in a manner assigned to different sections of the at least one transport path. If the optical signal can be displayed in quick succession at laterally slightly offset points of the display device, the impression of the optical signal migrating along the display device and therefore along the transport path results for the observer. The signal can therefore migrate with a piece good along the at least one transport path, at least in sections. In this case, it is likewise conceivable that the optical signal has a constant signal waveform or the signal waveform changes.

The observer of the conveyor system is a person observing the display device in order to be able to infer the operating state of the conveyor system, possible disruptions in the conveyor system or possible causes of a corresponding disruption in the conveyor system at least also on the basis of the display there. In this case, operators or service personnel for maintaining and repairing the conveyor system are typically possible as observers. The text below will therefore refer to operators or service personnel observing the conveyor system comprising the display device in order to be able to infer that operating state of the conveyor system, possible disruptions in the conveyor system or possible causes of a corresponding disruption in the conveyor system on the basis of the display there.

A control device is used to stipulate what signal waveform the optical signal has and the manner in which the optical signal is at least partially displayed along at least one transport path. This stipulation is based on predetermined criteria and current operating parameters of the conveyor system. At least one operating parameter of the conveyor system and/or at least one signal characterizing an operating parameter can be at least partially determined, if necessary, on the basis of at least one sensor and can be forwarded to the control device. The control device then processes the available and predetermined pieces of information and controls the display device accordingly. This is based on a comparison of pieces of information characterizing the predetermined conveyance of piece goods and pieces of information relating to the actual conveyance of the piece goods. In this case, the predetermined conveyance corresponds to the conveyance of the piece goods which will be expected during normal operation of the conveyor system and can therefore be readily calculated in advance with knowledge of the normal operating parameters. In other words, the control device receives and/or determines pieces of information relating to the relationship of the actual conveyance of at least one piece good along the at least one transport path with respect to the predetermined conveyance of the at least one piece good along the at least one transport path.

On account of the structure of the conveyor system, an optical signal can run along with at least one piece good, wherein the piece good runs along the at least one transport path, to be precise at least in sections, while the optical signal runs along the display device parallel thereto. Since the control device can use a comparison of pieces of information relating to the predetermined and therefore expected conveyance of a piece good and the actual conveyance of the piece good, the control device is able to display the display of the optical signal in accordance with the relationship of the actual conveyance of at least one piece good along the at least one transport path with respect to the predetermined conveyance of the at least one piece good along the at least one transport path and also to display it depending on the respective actual and/or predetermined location of the at least one piece good. An optical signal indicating undisrupted conveyance of the piece good can therefore be displayed beside the piece good along its predetermined conveyance, for example. The signal then migrates along with the piece good, to be precise alternatively or additionally along the predetermined transport route or transport path of the piece good, if necessary. However, this can scarcely be distinguished, if necessary, since the piece good moves along the transport path more or less in the same manner as has been predetermined in the case of undisrupted conveyance.

In the case of disrupted operation, however, the actual conveyance of the piece good along the transport path will differ significantly from the predetermined conveyance of the piece good. In particular, the piece good is considerably further forward or further back than precalculated at particular times. It may also be the case that the piece good is on another transport path than precalculated, for instance because the piece good was incorrectly diverted or incorrectly redirected at a fork of two transport paths. In principle, it is possible to specify here in the individual case which deviations are still considered to be within a tolerance or are already considered to be the consequence of disrupted operation. This can be stored in the control device, for example. If the predetermined location of the piece good for a particular time and the actual location of the piece good at this time now significantly differ from one another, an optical signal can be respectively displayed at the location of the display device assigned to the location of the piece good predetermined for the respective time. However, alternatively or additionally, an optical signal can be respectively displayed at the location of the display device assigned to the actual location of the piece good. Since the piece good actually moves along the at least one transport path in a predetermined manner, the at least one optical signal also preferably moves along the at least one transport path or the display device, to be precise at least in sections.

So that it is discernible for an operator or a member of service personnel whether a piece good is being moved in the predetermined manner or is actually being moved in a significantly different manner along the conveyor system on account of disrupted operation of the conveyor system, the optical signal may have a signal waveform which reveals this. For example, in the case of undisrupted operation, no signal can be displayed or a white or green signal can be displayed. In the case of disrupted operation, a red signal can be displayed, for example. However, signals of different colors can also be displayed for different piece goods, in which case the same color is then respectively displayed at the actual location and at the predetermined location if necessary. Even in the case of a very large number of piece goods, it is therefore easily apparent where a particular piece good would be in the case of undisrupted operation and where it actually is during actual operation.

However, as an alternative or in addition to signal waveforms of different colors, it is also possible to use signal waveforms of different shapes. The signal waveforms can then forward more detailed pieces of information relating to the type of disruption or the location of the disruption, for example, to the operator or the service personnel. For example, it is possible to select a display form which indicates by how much time, for instance in seconds, or by what distance, for instance in meters, the piece good has been transported more quickly or more slowly than predetermined. It is also possible to indicate, for example, at which fork of two transport paths a particular piece good has been incorrectly redirected.

The pieces of information made available to the operator or the service personnel by the display device can make it easier for the operator or the service personnel of the display device to detect imminent major operational disruptions in good time and/or to be able to quickly eliminate the existing operational disruptions. In this case, important pieces of information are displayed directly to the operator or the service personnel on the conveyor system and not only in a control room, for instance. In addition, the pieces of information are displayed in real time and based on particular piece goods since the conveyance of only individual piece goods differs from the predetermined conveyance of the piece goods under certain conditions. This can again be seen by the operator or the service personnel on the conveyor system itself, which can then be an indication of the respective disruption and the required maintenance. The operator or the service personnel can also directly see on the conveyor system whether and what success particular maintenance measures have on the operation of the conveyor system.

For the sake of better comprehensibility and in order to avoid unnecessary repetitions, the method and the conveyor system are described together in the present case without specifically distinguishing between the method and the conveyor system in each case. However, it is clear to a person skilled in the art from the respective context which features are particularly preferred with respect to the method and the conveyor system in each case.

In a first particularly preferred configuration of the method, the at least one optical signal is generated by an LED strip and/or display, in particular an LCD display, of the display device extending at least in sections along the at least one transport path. This allows optical signals to be displayed with very high resolution and at high speed and allows them to migrate along the at least one transport path. In this case, it is easier, in terms of apparatus, to alternatively or additionally use a projection device of the display device, which can project at least one optical signal onto a projection path of the display device extending at least in sections along the at least one transport path.

In order to enable the best possible comparison between the optical signal and the actual piece good for the operator or the service personnel, it is appropriate if the at least one optical signal is displayed with a longitudinal extent along the transport path which corresponds at least substantially to the longitudinal extent of the at least one piece good assigned to the signal. In this case, it is easy to determine whether the optical signal representing the predetermined transport of the piece good is in line with the actual piece good or whether there is a shift between the actual piece good and the piece good represented by the optical signal in the predetermined conveyance in the longitudinal direction of the transport path.

Alternatively or additionally, the at least one optical signal can be moved at least in sections along the transport path in a manner corresponding to the predetermined conveyance of the at least one piece good assigned to the at least one signal along the at least one transport path. This makes a comparison between the predetermined conveyance of the piece good and the actual conveyance of the corresponding piece good easily possible. In many cases, the operator can immediately infer the disruption and its cause from the possible difference between the optical signal and the transport of the actual piece good, which accelerates the repair of the conveyor system. In this case, the comparison of different piece goods can also provide information on the disruption and its cause. For example, successive actual piece goods need not be transported in the same manner contrary to the predetermined conveyance. The situation may also occur in which a corresponding deviation occurs only for particular piece goods or periodically, which may be an indication of a particular disruption. However, it may also be the case that the transport of different piece goods deviates from the conveyance predetermined for the piece goods in a different manner in each case.

In order to discern whether a piece good is transported as desired or in what manner the actual transport of the piece good deviates from the predetermined transport of the same piece good, it is appropriate if the at least one optical signal and the at least one piece good assigned to the at least one signal are moved in a manner corresponding to one another along the at least one transport path and along the display device in the case of undisrupted transport of the at least one piece good. If the optical signal migrates along the display device in accordance with the transport of the piece good along the transport path, undisrupted operation of the conveyor system and transport of the piece good can be inferred.

So that the operator or the service personnel of the conveyor system can easily discern where a disruption in the operation of the conveyor system occurs and what causes this disruption, when passing a location at which a predetermined deviation of the actual conveyance of at least one piece good along the at least one transport path from the predetermined conveyance of the at least one piece good along the at least one transport path occurs, the signal waveform of the optical signal can change. For example, the signal waveform of the optical signal can be changed from a signal waveform characterizing disruption-free transport of the at least one piece good to a signal waveform characterizing disrupted transport of the at least one piece good by means of the control device. It is thus indicated to the operator or the service personnel of the conveyor system when the transport of a piece good is disrupted, as of when the transport of a piece good is disrupted and where the disruption occurs. This applies, in particular, when the optical signal running along with the at least one piece good retains at least one signal waveform characterizing disrupted transport of the at least one piece good as long as the signal runs along with the piece good along the at least one transport path and there is disrupted transport of the at least one piece good at the respective location of the display.

If the disruption in operation is removed again, with the result that the corresponding piece good is conveyed again in the predetermined manner as of a particular location along the transport path, the signal waveform can again assume a signal waveform characterizing undisrupted conveyance of the piece good, if necessary. Alternatively, however, a signal waveform signaling disrupted operation can still be displayed. In this case, it may be particularly preferred if, during conveyance as intended again, the signal waveform differs from the signal waveform which was previously displayed when the conveyance of the piece good did not correspond to the conveyance as intended. It is therefore discernible to the operator or the service personnel that two events which were not predetermined have occurred in succession and have influenced the conveyance of the piece good in a manner which was not predetermined. This also applies, in principle, to the situation in which a piece good experiences a plurality of disruptions in succession during transport along the conveyor system which do not result in the piece good being transported again in the predetermined manner at a particular location. As a result of the then changing signal waveforms along the at least one transport path, it becomes discernible to the operator or the service personnel that the conveyance of the piece good has been disrupted several times in succession. This knowledge results in the causes of the individual disruptions being able to be eliminated more quickly.

In order to increase the information content of the optical display for the operator or the service personnel, with the result that the latter can distinguish different operating states and disruptions which cannot be readily seen from the piece good and its transport itself, it is appropriate if the at least one signal waveform characterizing disruption-free transport of a piece good and/or the at least one signal waveform characterizing disrupted transport of a piece good has/have a predetermined color and/or a predetermined symbol. Different optical signals and/or signal waveforms can be displayed in different colors, for example, if a piece good is transported too quickly, too slowly or at the correct speed. Different signal waveforms and colors can also be displayed if only the transport of individual piece goods is disrupted or if a particular number of piece goods transported in succession are transported in a manner disrupted in the same way and/or to the same extent, that is to say deviate from the respective predetermined transport with respect to their transport.

If it is detected or determined by the control device that a predetermined deviation between the predetermined transport of the piece good and the actual transport of the piece good is exceeded as of a particular location along the transport path, this location can be identified as the location of the disruption and can be displayed to the operator or the service personnel via the display device. For example, the at least one signal waveform characterizing disrupted transport of a piece good can be permanently or periodically displayed at such a location of the disruption as the location at the transition from the undisrupted transport to the disrupted transport of at least one piece good. In this case, the permanent display has the advantage that the location of the disruption can be continuously detected. In this case, the periodic display can be effected, if necessary, whenever a corresponding deviation from the predetermined transport of a piece good occurs, in order to display the corresponding occurrence of the corresponding disruption. However, a periodically flashing display of the signal waveform can also be effected, which can also be seen better from a greater distance and can therefore guide the operator or the service personnel quickly to the location of the disruption.

If necessary, it is helpful, in order to obtain pieces of information relating to different operating states and deviations from the intended operation of the conveyor system, if the display device can display at least one signal waveform for indicating a fault-free state, at least one signal waveform for indicating at least one faulty state, at least one signal waveform for indicating at least one fault-initiating state and/or at least one signal waveform for indicating at least one workable state. In this case, the signal waveform can be displayed locally at a location which has the corresponding state or can migrate together with a piece good which has been subjected to the corresponding state. In the fault-free state, at least one predetermined parameter with respect to the conveyance of at least one piece good is within a predetermined tolerance range. In a faulty state, at least one parameter with respect to the conveyance of at least one piece good is outside a predetermined tolerance range. In a fault-initiating state, at least one predetermined parameter with respect to the conveyance of at least one piece good is within a predetermined tolerance range, but is getting closer and closer to a tolerance limit of the tolerance range, with the result that it can be expected that the tolerance limit will soon be exceeded. In the present case, it is possible to distinguish between main parameters and secondary parameters in the case of the parameters. In this case, the main parameters are more important for the conveyance of the piece goods. In the case of main parameters and secondary parameters, a fault-free state can be characterized in that the at least one main parameter and the at least one secondary parameter with respect to the conveyance of at least one piece good are within a predetermined tolerance range, while a workable state is distinguished by the fact that only the at least one secondary parameter is outside the tolerance range and the at least one main parameter is inside the tolerance range. The faulty state can exist when at least one main parameter is outside the tolerance range. In the fault-initiating state, it is possible to distinguish between the at least one main parameter and the at least one secondary parameter. However, this is not necessary.

Alternatively or additionally, the relationship of the actual conveyance of at least one piece good along the at least one transport path with respect to the predetermined conveyance of the at least one piece good along the at least one transport path can be determined depending on the respective location of the at least one piece good by means of at least one comparison between at least one predetermined normative value and at least one measured value relating to the transport of at least one piece good along the at least one transport path. A state of the conveyance of a particular piece good and/or of the conveyor system can therefore be determined at each location at which this determination is carried out. The state can then be displayed using the display device, to be precise, if necessary, using a signal waveform locally at a location representing the corresponding state or in a manner migrating with the piece good which has been subjected to the corresponding state. A nominal value of the corresponding parameter, which is reached after running up the conveyor device, is possible, for example, as a normative value. The normative value can correspond to a parameter which has been set or can result depending on the settings of the conveyor system. If necessary, the nominal value can be considered to be the technically achievable value of the parameter which can be achieved with the conveyor system and the settings which have been made. The normative value can also be a normal value comprising all values of the parameter between the tolerance limits of the parameter. The tolerance limit value as the normative value characterizes the tolerance limits, outside which there is no longer a workable state. An intervention value, which represents at least one limit value which, when exceeded and/or undershot, does not ensure freedom from failure of the conveyor system until the next planned maintenance or repair, is also possible as a normative value.

So that the operator or the service personnel of the conveyor system is quickly informed of possible disruptions and their causes, it may be expedient if the actual conveyance of the piece good is related to the predetermined conveyance of the corresponding piece good not only for individual piece goods and independently of one another in each case. This is because additional pieces of information can be derived if the subsequent piece goods deviate from the predetermined conveyance in the same manner, just do not deviate from the predetermined conveyance or deviate from the predetermined conveyance in a different manner. These pieces of information allow the cause of the corresponding disruption to be inferred in a targeted manner. Therefore, the relationship of the actual conveyance of a series of piece goods transported in succession along the at least one transport path with respect to the predetermined conveyance of the same series of piece goods along the at least one transport path can be determined for each piece good depending on the respective locations of the corresponding piece goods and can be compared with the other relationships determined for the other piece goods in the series of piece goods.

Alternatively or additionally, at least one cause of a deviation between the predetermined conveyance and the actual conveyance of the corresponding piece good can be inferred by the control device on the basis of the relationship of the actual conveyance of at least one piece good along the at least one transport path with respect to the predetermined conveyance of the at least one piece good along the at least one transport path depending on the respective location of the at least one piece good. This is possible in a targeted manner, for example, when the relationship between particular disruptions of the conveyor system and resulting relationships between the actual conveyance and the predetermined conveyance of piece goods along a particular transport path are stored in the control device. The operator or the service personnel of the conveyor device can therefore first of all track the disruption predetermined as probable by the control device in order to be able to eliminate the disruption as quickly as possible. This is further simplified by the fact that at least one signal from the display device migrates at least in sections along the transport path of the at least one piece good in the direction of the point of origin assigned to the at least one cause, in particular repeatedly, and/or at least one signal from the display device is displayed at a location of the display device assigned to the point of origin. Alternatively or additionally, the at least one signal can migrate, in particular repeatedly, from the location actually assigned to the piece good to the location of the disruption as the location at the transition from the undisrupted transport to the disrupted transport of at least one piece good. In both cases, the operator or the service personnel of the conveyor system is very quickly guided to the location at which it is probably necessary to intervene in order to eliminate the disruption.

This can also be supported by the fact that the at least one signal migrates, in particular repeatedly, from the location of the disruption as the location at the transition from the undisrupted transport to the disrupted transport of at least one piece good to the location of the display device assigned to the point of origin assigned to the disruption. The operator or the service personnel of the conveyor system can then very easily follow the signal to the location of presumed intervention.

In a first particularly preferred configuration of the conveyor system, the display device comprises an LED strip extending at least in sections along the at least one transport path and/or a projection device for projecting the signal onto a projection path extending at least in sections along the at least one transport path and/or a display, in particular an LCD display, extending at least in sections along the at least one transport path. Very different signals can therefore also be displayed very easily and quickly at different locations along the at least one transport path in order to very quickly and comprehensively inform the operator or the service personnel of the conveyor system of possible disruptions and/or their causes.

BRIEF DESCRIPTION OF THE DRAWINGS

The invention is described in more detail below on the basis of a drawing illustrating only exemplary embodiments. In the drawing.

DETAILED DESCRIPTION

Figure 1:
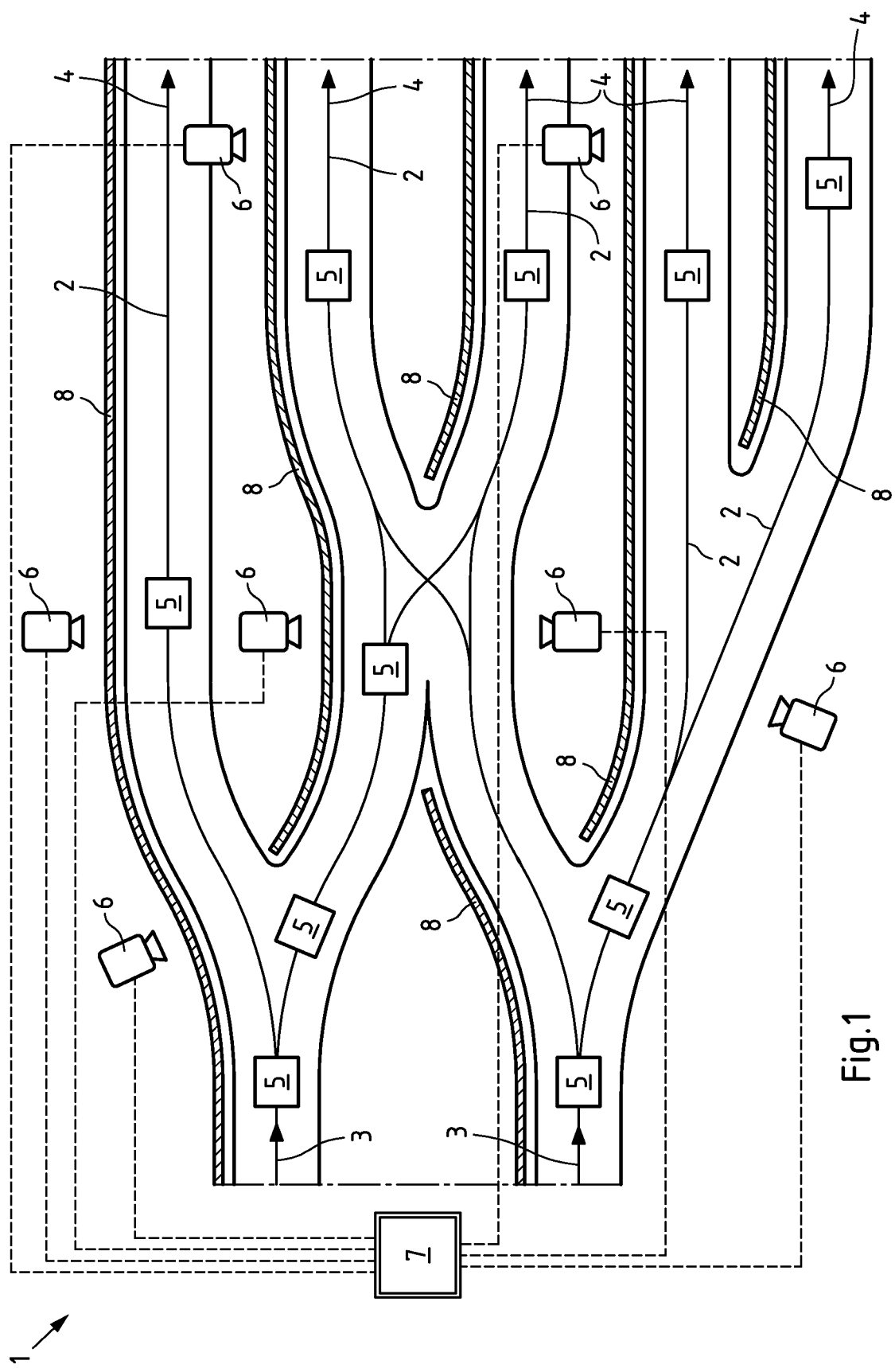
FIG. 1 shows a schematic plan view of a conveyor system according to the invention.

FIG. 1 illustrates a conveyor system 1 which provides a plurality of transport paths 2. The transport paths 2 start from different starting positions 3 and end at different end positions 4 depending on the respective transport path 2. The conveyor system 1 can also be designed considerably differently. However, the important factor is that the conveyor system 1 has at least one transport path 2 for transporting separated piece goods 5 which may be packages, in particular parcel shipments. The piece goods 5 are placed onto the conveyor system 1 in the starting portions 3. The conveyor system 1 is set for particular transport and/or sorting tasks. On the basis of the settings and corresponding specifications, it is possible to precalculate, at least for individual piece goods or particular piece goods 5, their conveyance along the predetermined transport 2 in terms of time. How the corresponding piece good 5 then actually moves along the transport path 2 in terms of time can be captured by means of sensors 6 which are distributed along the at least one transport path 2, in particular along the conveyor system 1 as such. The sensors 6 may be, for example, scanners which capture a code provided on the respective piece good 5 and thus determine where the piece goods 5 are at a particular time. However, the piece goods 5 may be provided with so-called RFID tags or the like which are captured by sensors 6 which are integrated in the conveyor system 1 and are in the form of reading units for reading the RFID tags. It is also therefore determined which piece goods 5 are at which location at which time. Other suitable sensors are conceivable and are known per se.

The sensors 6 distributed over the conveyor system 1 are connected to a control device 7, to which the sensors 6 transmit signals or pieces of information relating to the positions of the piece goods 5 at particular times. The control device 7 also receives or determines pieces of information relating to the predetermined temporal conveyance of the piece goods 5 along the transport paths 2. The control device 7 processes these signals or pieces of information and relates the actual conveyance of the piece goods 5 for particular times to the predetermined conveyance of the piece goods 5 for these times. There is therefore a comparison between the theoretical, that is to say precalculated, conveyance of the piece goods 5 and the practical, that is to say actual, conveyance of the piece goods 5. On the basis of this comparison or on the basis of this relationship, the control device 7 controls a display device 8 which extends along the transport paths 2 in the illustrated conveyor system 1. The display device 8 can display optical signals under the control of the control device 7 and can assign these signals to particular piece goods 5, with the result that optical signals assigned to piece goods 5 can be displayed, said optical signals being dependent on the comparison of the predetermined conveyance and the actual conveyance for this corresponding piece good 5. However, the optical signal is not only displayed once at a particular location along the transport path of the corresponding piece good. Rather, the signal runs with the piece good 5, in any case assigned to the piece good 5, along the at least one transport path 2. The display device 8 is therefore also not locally arranged, but rather is arranged at least in sections along at least one transport path 2.

Figure 2A:
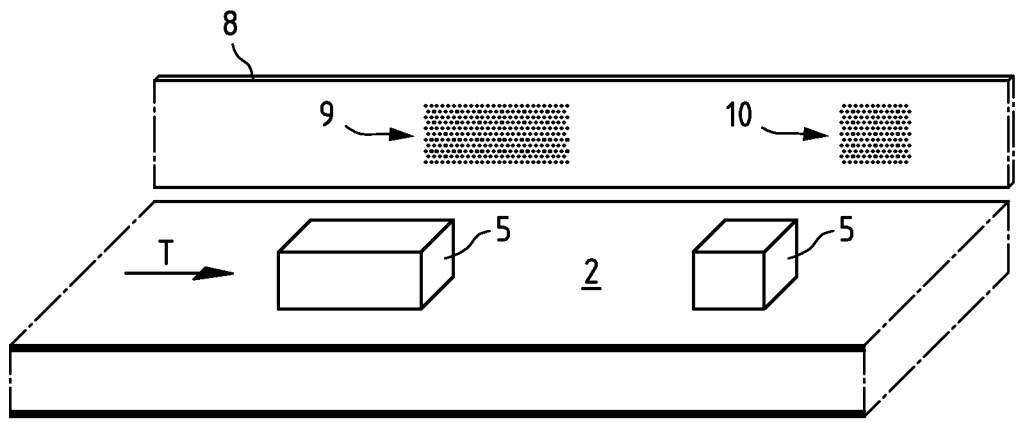
FIGS. 2A-C show a schematic side view of a detail of a conveyor system according to the invention in different operating states.
Figure 2B:
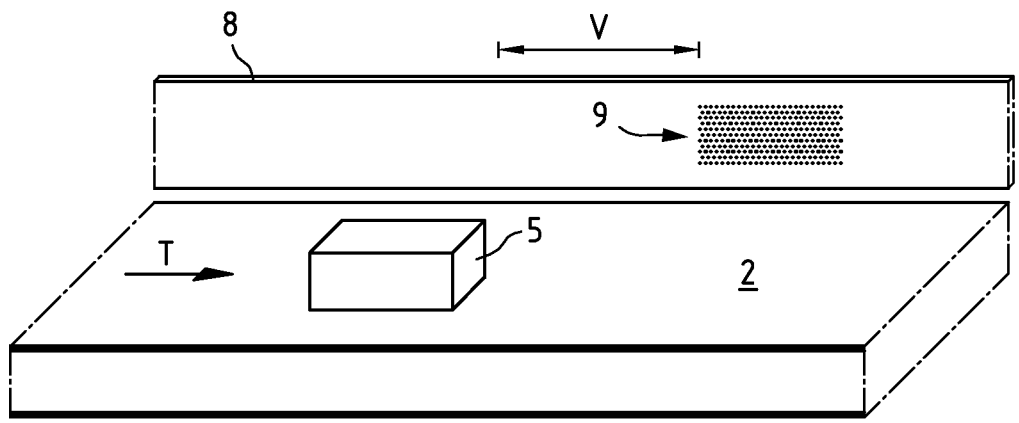
Figure 2C:
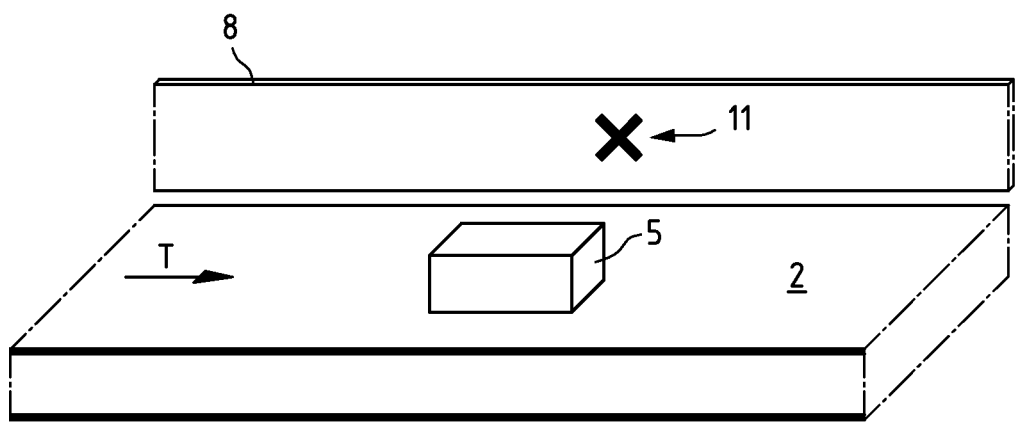

The control of the display device 8 by the control device 7 in a manner assigned to the actual transport of particular piece goods 5 is illustrated, for example, in FIGS. 2A-C. FIG. 2A illustrates two piece goods 5 of different lengths in the transport direction T. The display device 8 displays optical signals 9, 10 in a manner assigned to the locations of the piece goods 5, the longitudinal extent of which signals along the transport path 2 corresponds at least substantially to the longitudinal extent of the piece goods 5. The optical signals 9, 10 migrate with the piece goods 5 along the transport path 2. In this case, the optical signals 9, 10 illustrate the precalculated arrangement of the piece goods 5 at the different times of the conveyance of the latter. From the fact that the piece goods 5 move along the transport path 2 in the same manner as the associated optical signals 9, 10 move along the display device 8 without this resulting in a significant offset between the piece good 5 and assigned optical signal 9, 10, it can be read that the piece goods 5 are being transported as predetermined. The conveyor system 1 is therefore clearly operating in the set and desired manner. Therefore, there can be no fear of disruptions in operation.

In contrast, FIG. 2B illustrates disrupted conveyance of a piece good 5. The movement of the optical signal 9 along the display device 8 represents the conveyance of the piece good 5 along the transport path 2 during undisrupted operation, as was calculated in advance. The actual conveyance of the associated piece good 5 lags behind the predetermined conveyance of the piece good 5 with a certain offset V. This can be readily read from a comparison between the optical signal 5 representing the expected transport of the piece good 5 and the actual transport of the piece good 5. As an alternative or in addition to an optical signal 9 representing the expected transport of the piece good 5, which may be at a considerable distance from the actual piece good 5 during disrupted operation of the conveyor system 1, an optical signal 11 can be displayed with the actual transport of the piece good 5 and in a manner always directly assigned to the piece good or parallel to the latter, from the signal waveform of which signal, here a red cross for example, it is directly clear that the corresponding piece good 5 is currently not being transported along the transport path 2 as would have been expected. The conveyance of this particular piece good 5 is therefore disrupted. In this case, the type of signal waveform or its color can additionally represent the type and/or extent of the disruption in the conveyance of the piece good 5. Since the operator of the conveyor system 1 or a member of service personnel receives current pieces of information relating to the disruption via the display devices 8 according to FIGS. 2B-C in situ in the conveyor system, a cause can be quickly inferred and the disruption can therefore be quickly eliminated. As a result, the availability of the conveyor system 1 possibly increases significantly.

Figure 3:
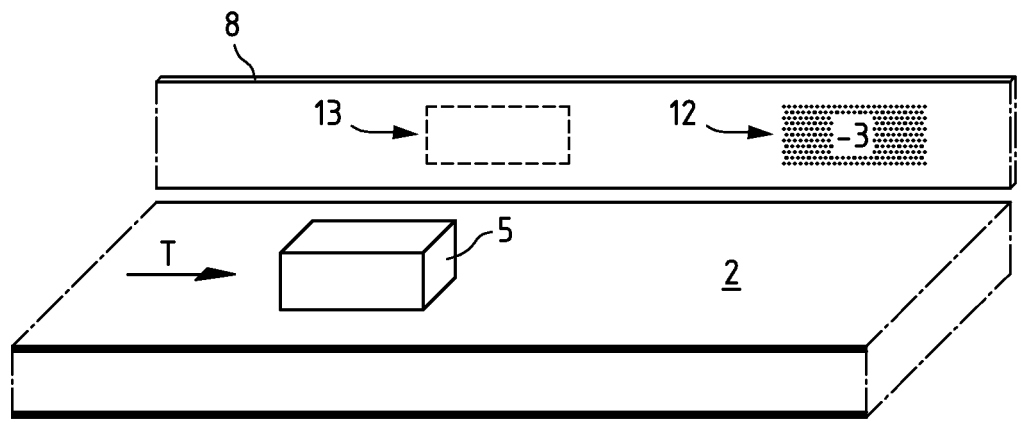
FIG. 3 shows a schematic side view of a detail of a conveyor system according to the invention.

In order to further increase the information content for the operator of the conveyor system 1 or a member of service personnel, even if a very large number of piece goods 5 are transported at short intervals along a transport path 2, an illustration according to FIG. 3 may be appropriate. This is because, in the event of a disruption, the actual piece goods 5 can be assigned only with difficulty to the optical signals 12 representing undisrupted conveyance of the piece goods 5, if necessary. An optical signal 13 of a color which corresponds to the color of the optical signal 12 representing undisrupted conveyance of the corresponding piece good 5 is then assigned to a piece good 5. In this case, different colors can be assigned to different piece goods 5, thus facilitating an assignment of the piece goods 5 to the optical signals 12 representing undisrupted conveyance of the same piece goods 5. Alternatively or additionally, the optical signal 12 representing the predetermined transport of a piece good 5, which has not been transported in the predetermined manner however, can contain information relating to the extent of the deviation of the actual conveyance from the expected conveyance. In the present case, "−3" is displayed, which can indicate a delay of 3 seconds or 3 meters. Other indications, for instance in the form of symbols, are likewise conceivable.

Figure 4:
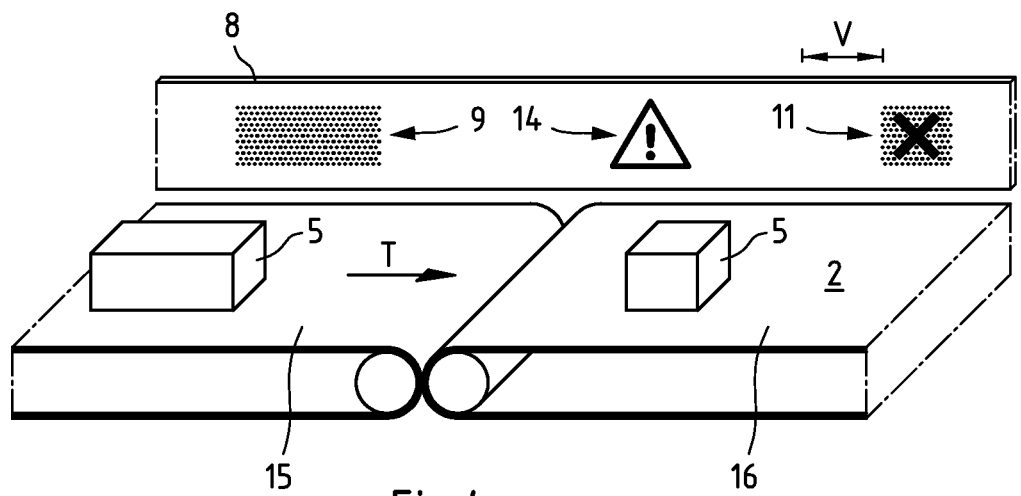
FIG. 4 shows a schematic side view of a detail of a conveyor system according to the invention.

According to FIG. 4, when monitoring the conveyance of the piece goods 5 and during the regular comparison with the expected conveyance of the piece goods 5, the control device 7 can determine where approximately a disruption in the conveyance occurred for the first time and can then indicate this location for the operator of the conveyor system 1 or a member of service personnel using an optical signal 14 on the display device 8. The operator or service personnel is therefore quickly guided to the location of the disruption. In this case, the location of the disruption is, in a purely exemplary manner, the transition of the piece goods 5 from one conveyor device 15 of the conveyor system 1 to a subsequent conveyor device 16 of the conveyor system 1. Two piece goods 5 are illustrated in the present case, in which case the piece good 5 illustrated on the left moves in sync with the optical display 9 which displays the expected conveyance of the piece good 5. In contrast, the piece good 5 illustrated on the right has an offset V with respect to the assigned optical signal 11 which represents the expected conveyance of said piece good. Since this can be attributed to disrupted conveyance of the piece good 5, the optical signal 11 is composed of a signal waveform representing the length of the piece good 5 and a signal waveform in the form of a red cross. In addition, the location at which the disruption occurs is indicated via the control device 7 by means of an optical signal 14, for example in the form of a triangle. This optical signal 14 does not migrate with a piece good 5 over the display device 8, but rather remains in this position until the disruption in the conveyance of the piece goods 5 no longer occurs at this location.

Figure 5A:
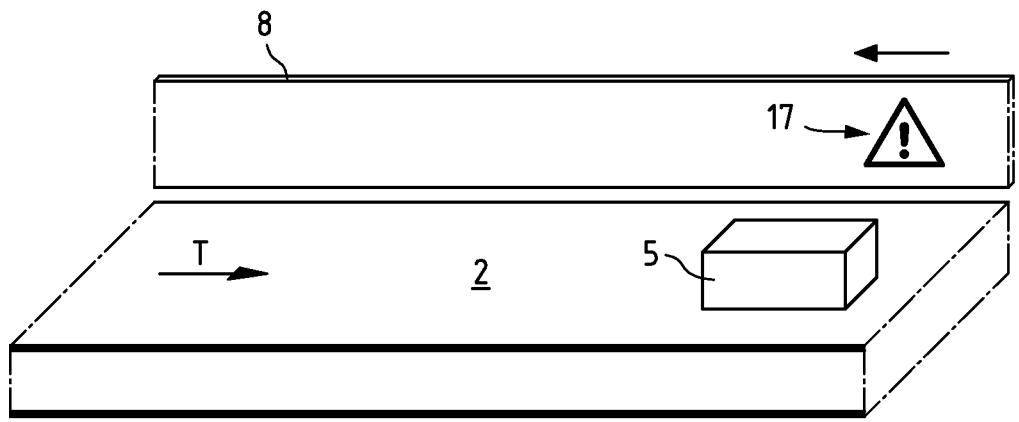
FIGS. 5A-C show a schematic side view of a detail of a conveyor system according to the invention in different operating states.
Figure 5B:
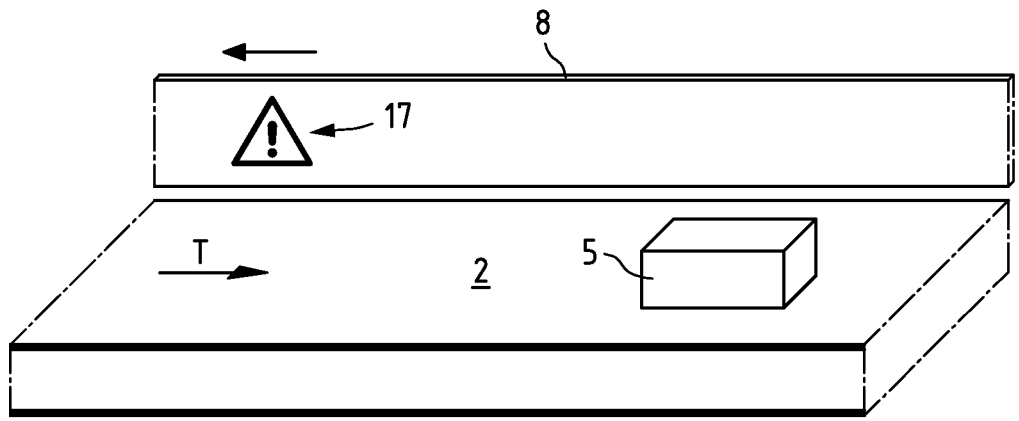
Figure 5C:
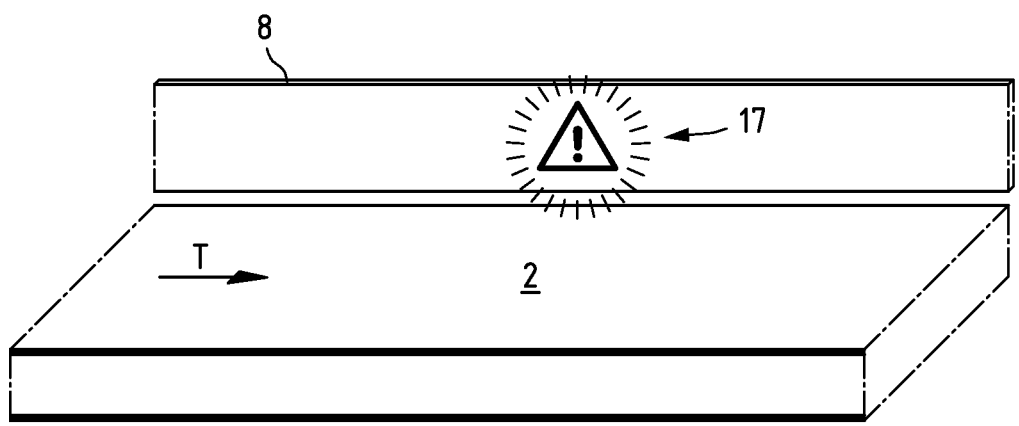

If the location of the disruption is at least partially known, it is possible, starting from a location of the display device 8 that is assigned to the location at which a piece good 5 which has been impaired by the corresponding disruption is currently situated, to display an optical signal 17 representing a disruption, here for instance a triangle, and to then move it, contrary to the transport direction of T of the piece good 5, along the display device 8 to the location assigned to the location of the presumed disruption along the transport path 2. FIG. 5A illustrates how the optical signal 17 representing the disruption is displayed beside the piece good 5 conveyed in a disrupted manner. In FIG. 5B, the piece good 5 has been moved further in the transport direction T and the optical signal 17 has been moved further contrary to this transport direction T. In FIG. 5C, the optical signal 17 is displayed at the location of the disruption, where the optical signal 17 can remain for a while and/or can flash in order to additionally indicate the location of the disruption.

Figure 6:
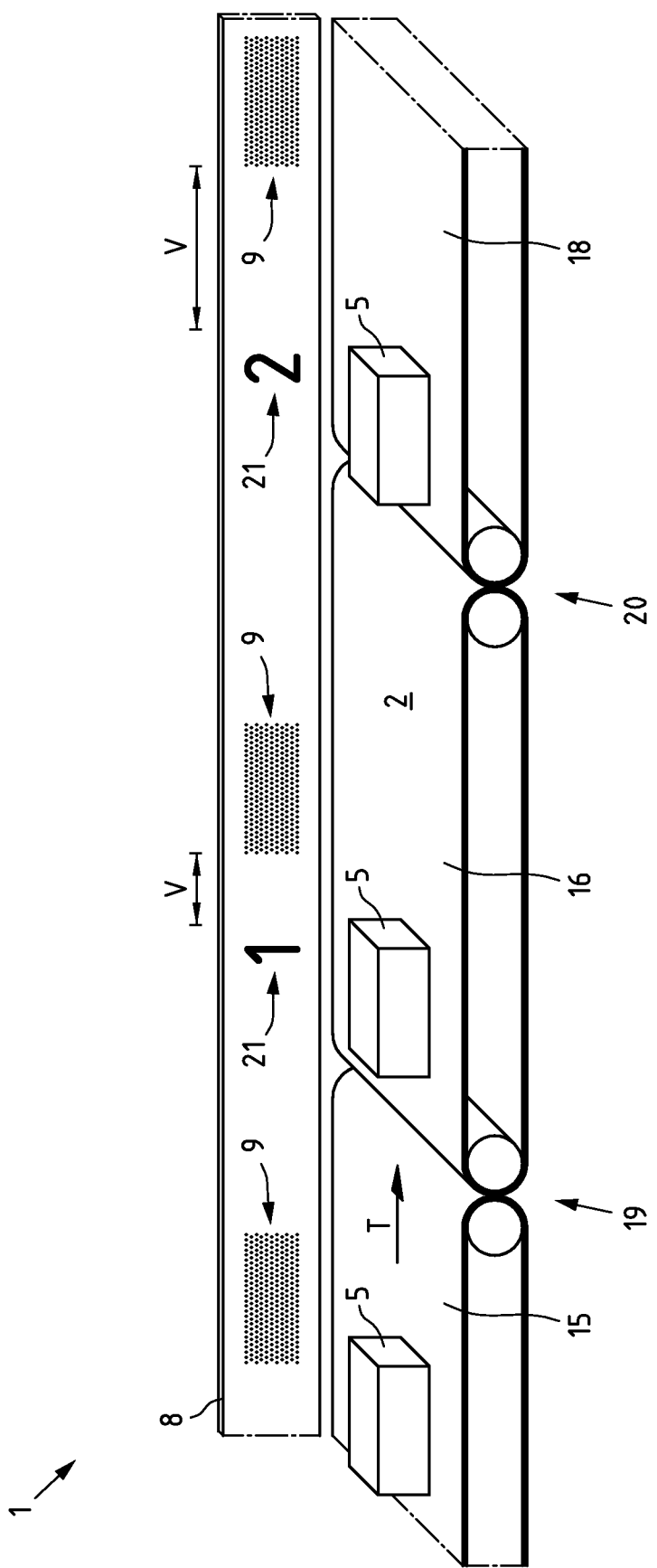
FIG. 6 shows a schematic side view of a detail of a conveyor system according to the invention.

FIG. 6 illustrates, by way of example, a conveyor system 1 in which the piece goods 5 must pass through three different conveyor devices 15, 16, 18 along the transport path 2, and wherein the conveyance of the piece goods 5 is disrupted at the transitions 19, 20 between the conveyor devices 15, 16, 18. The transitions 19, 20 of the conveyor devices 15, 16, 18 are illustrated only by way of example here. Other locations of the disruption in the conveyance of the piece goods 5 are conceivable. A piece good 5 in front of the first transition 19 is still undisrupted and the optical signal 9 assigned to the piece good 5 runs along in sync with the piece good 5 along the transport path 2 in the transport direction T, but only on the display device 8. After the first transition 19, there is an offset V between the piece good 5 and the optical signal 9 linked to the latter. In addition, a symbol 21 is displayed adjacent to the piece good 5 or to the optical signal 9, which symbol represents a first disruption in the conveyance. In the present case, this is a "1" by way of example. After the next transition 20 between two subsequent conveyor devices 16, 18, the offset V between the piece good 5 and the optical signal 9 assigned to the piece good 5 becomes even greater because a second disruption has occurred. This is indicated in the present case by an optical signal in the form of a "2" adjacent to the piece good 5. However, the symbols or signals 21 could also be displayed in the region of the other optical signal 9 for this piece good 5, said signal indicating the respective expected position of the piece good 5. Alternatively or additionally, other symbols are also possible.

Figure 7:
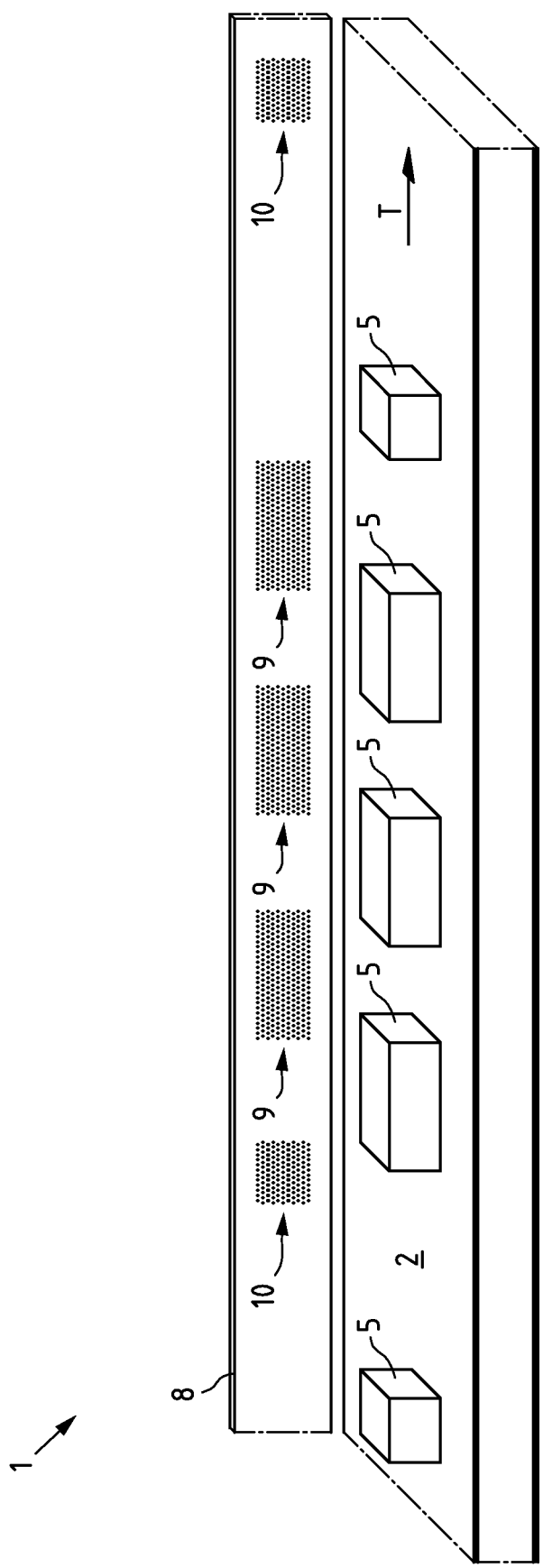
FIG. 7 shows a schematic side view of a detail of a conveyor system according to the invention.

FIG. 7 illustrates a conveyor system 1 detail, in which not all piece goods 5, but rather only particular piece goods 5, are not conveyed as expected. In the present case, the disruption can occur either periodically or in smaller piece goods 5. This can not be discerned more accurately on the basis of the illustrated detail. However, this would be possible if closely observing the real conveyor device 1. A piece good 5 which lags behind the associated optical signal 10 is illustrated on the far left on a transport path 2. The conveyance is therefore carried out with a delay contrary to expectations. The same is the case for the piece good 5 illustrated on the far right. However, the three piece goods 5 in between move in sync with and adjacent to the associated optical signals 9 representing the expected conveyance of the piece goods 5. The disruption may therefore affect only every fourth piece good 5 or only the smaller piece goods 5. This are additional pieces of information which can indicate the cause of the disruption.

Figure 8:
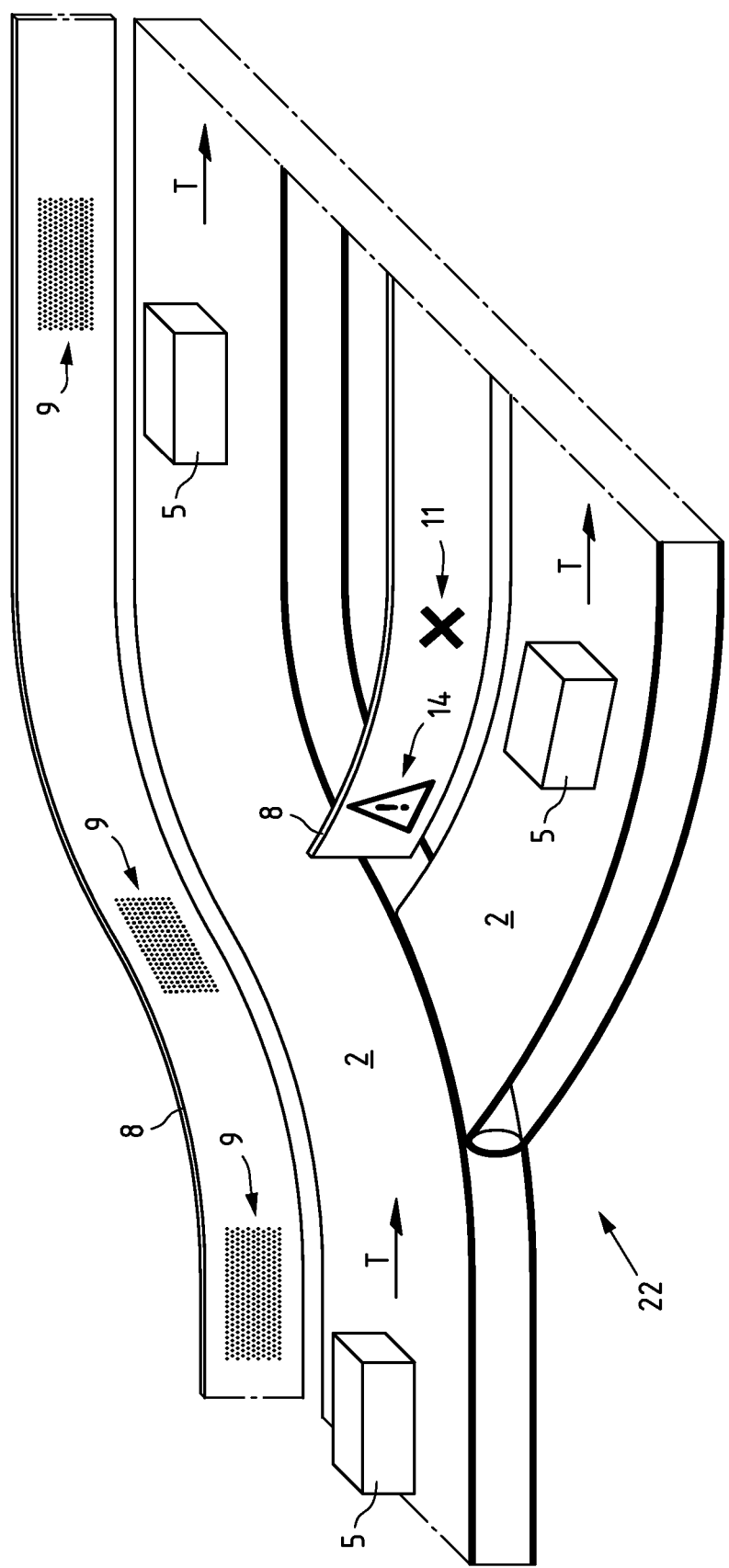
FIG. 8 shows a schematic side view of a detail of a conveyor system according to the invention.

FIG. 8 illustrates a conveyor system 1 having a fork 22. The piece good 5 moved toward the fork 22 is in line with the optical signal 9 and moves in sync with the latter. There is therefore no disrupted operation. The same applies to the piece good 5 on the far right. In contrast, the middle piece good 5 has been incorrectly diverted for some reasons at the fork 22. The assigned optical signal 9 is displayed on the other branch of the fork 22, where the piece good 5 should have been expected. However, the piece good 5 is actually transported along the other branch of the fork 22. An optical signal 11 in the form of a cross moves, in a manner assigned to the piece good 5, with the latter along the further transport route or transport path 2, with the result that it is clear that the piece good 5 has not been conveyed as intended. On account of the observation of the piece good 5, the control device 7 can also infer that the location of the disruption must be in the region of the fork 22, which is why a further optical signal 17 which is intended to indicate the supposed location of the disruption is displayed in a stationary manner at the fork 22.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for monitoring and/or maintaining a conveyor system transporting separated piece goods, in particular packages, wherein the conveyor system has a display device extending at least in sections along a transport path for the piece goods, wherein the display device is designed to display at least one optical signal at different points of the at least one transport path, and wherein the display device is coupled to a control device, the method comprising the steps of:
receiving and/or determining by the control device pieces of information relating to the relationship of an actual conveyance of at least one piece good along the at least one transport path with respect to a predetermined conveyance of the at least one piece good along the at least one transport path,
displaying an optical signal running along parallel to a piece good transported along the at least one transport path at least in sections by the display device, and
wherein the optical signal running along with the at least one piece good indicates the relationship of the actual conveyance of at least one piece good along the at least one transport path with respect to the predetermined conveyance of the at least one piece good along the at least one transport path depending on the respective actual and/or predetermined location of the at least one piece good.

2. The method according to claim 1,
wherein the at least one optical signal is generated by an LED strip of the display device extending at least in sections along the at least one transport path, and/or
wherein the at least one optical signal is generated by a projection device onto a projection path of the display device extending at least in sections along the at least one transport path, and/or
wherein the at least one optical signal is generated by a display, in particular an LCD display, of the display device extending at least in sections along the at least one transport path.

3. The method according to claim 1, wherein the at least one optical signal is displayed with a longitudinal extent along the transport path which corresponds at least substantially to the longitudinal extent of the at least one piece good assigned to the optical signal.

4. The method according to claim 1,
wherein the at least one optical signal is moved at least in sections along the transport path in a manner corresponding to the predetermined conveyance of the at least one piece good assigned to the at least one signal along the at least one transport path, and preferably
wherein the at least one optical signal and the at least one piece good assigned to the at least one signal are moved in a manner corresponding to one another along the at least one transport path and along the display device in the case of undisrupted transport of the at least one piece good.

5. The method according to claim 1,
wherein, when passing a location at which a predetermined deviation of the actual conveyance of at least one piece good along the at least one transport path in comparison with the predetermined conveyance of the at least one piece good along the at least one transport path occurs, the optical signal changes from a signal waveform characterizing disruption-free transport of the at least one piece good to a signal waveform characterizing disrupted transport of the at least one piece good, and preferably
wherein the optical signal running along with the at least one piece good retains at least one signal waveform characterizing disrupted transport of the at least one piece good as long as the signal runs along with the piece good along the at least one transport path and there is disrupted transport of the at least one piece good at a respective location of the display.

6. The method according to claim 5, wherein the at least one signal waveform characterizing disruption-free transport of a piece good and/or the at least one signal waveform characterizing disrupted transport of a piece good has/have a predetermined color and/or a predetermined symbol.

7. The method according to claim 5, wherein the at least one signal waveform characterizing disrupted transport of a piece good is permanently or periodically displayed at a location of the disruption as the location at a transition from the undisrupted transport to the disrupted transport of at least one piece good.

8. The method according to claim 5, wherein the display device can display at least one signal waveform for indicating a fault-free state, at least one signal waveform for indicating at least one faulty state, at least one signal waveform for indicating at least one fault-initiating state and/or at least one signal waveform for indicating at least one workable state.

9. The method according to claim 5,
wherein the relationship of the actual conveyance of at least one piece good along the at least one transport path with respect to the predetermined conveyance of the at least one piece good along the at least one transport path is determined depending on the respective location of the at least one piece good by means of at least one comparison between at least one predetermined normative value and at least one measured value relating to the transport of at least one piece good along the at least one transport path, and preferably wherein:
the at least one predeterminded normative value can correspond to a parameter which has been set or can result depending on settings of the conveyor system;
an at least one nominal value can correspond to the technically achievable value of a parameter which can be acheived with the conveyor system and settings which have been made or to a value of a parameter which is reached after running up the conveyor device, an at least one intervention value, when exceeded and/or undershot, can correspond to bot ensuring freedom from failure of the conveyor system until the next planned maintenance repair;

an at least one nominal value can comprise all values of a parameter between tolerance limits of the parameter;

an at least one limit value can correspond to a tolerance limit value that characterizes tolerance limits outside which there is no longer a workable state; and wherein the at least one nominal value, the at least one intervention value, the at least one normal value and/or the at least one limit value is/are used as at least one normative value.

10. The method according to claim 1, wherein the relationship of the actual conveyance of a series of piece goods transported in succession along the at least one transport path with respect to the predetermined conveyance of the same series of piece goods along the at least one transport path is determined for each piece good depending on the respective locations of the corresponding piece goods and is compared with the other relationships determined for the other piece goods in the series of piece goods.

11. The method according to claim 1, wherein at least one cause is inferred by the control device on the basis of the relationship of the actual conveyance of at least one piece good along the at least one transport path with respect to the predetermined conveyance of the at least one piece good along the at least one transport path depending on the respective location of the at least one piece good, and preferably wherein at least one signal from the display device migrates at least in sections along the transport path of the at least one piece good in the direction of the point of origin assigned to the at least one cause, and/or at least one signal from the display device is displayed at a location of the display device assigned to the point of origin.

12. The method according to claim 11, wherein the at least one signal migrates, in particular repeatedly, from a location of a disruption as the location at a transition from an undisrupted transport to a disrupted transport of at least one piece good to the location of the display device assigned to the point of origin assigned to the disruption, and/or wherein the at least one signal migrates, in particular repeatedly, from the location actually assigned to the piece good to the location of the disruption as the location at the transition from the undisrupted transport to the disrupted transport of at least one piece good.

13. A conveyor system for transporting piece goods, in particular packages, wherein the conveyor system has a display device extending at least in sections along a transport path for the piece goods, wherein the display device is designed to display at least one optical signal at different points of the at least one transport path, and wherein the display device is coupled to a control device;

wherein to carry out a method for monitoring and/or maintenance, in particular according to claim 1, the control device is designed to receive and/or determine pieces of information relating to the relationship of the actual conveyance of at least one piece good along the at least one transport path with respect to the predetermined conveyance of the at least one piece good along the at least one transport path, wherein the display device is designed to display, at least in sections, an optical signal running along parallel to a piece good transported along the at least one transport path, and wherein the control device is designed to display the relationship of the actual conveyance of at least one piece good along the at least one transport path with respect to the predetermined conveyance of the at least one piece good along the at least one transport path depending on the respective actual and/or predetermined location of the at least one piece good using the optical signal running along with the at least one piece good.

14. The conveyor system according to claim 13, wherein the display device comprises an LED strip extending at least in sections along the at least one transport path and/or a projection device for projecting the signal onto a projection path extending at least in sections along the at least one transport path and/or a display, in particular an LCD display, extending at least in sections along the at least one transport path.

* * * * *

UNITED STATES PATENT AND TRADEMARK OFFICE
CERTIFICATE OF CORRECTION

PATENT NO. : 11,104,520 B2  
APPLICATION NO. : 16/864611  
DATED : August 31, 2021  
INVENTOR(S) : Bernd Hartmann et al.

Page 1 of 1

It is certified that error appears in the above-identified patent and that said Letters Patent is hereby corrected as shown below:

In the Claims

Column 17, Line 2, Claim 9, Line 21, reads "undershot, can correspond to bot ensuring freedom" and should read --undershot, can correspond to not ensuring freedom--

Column 17, Line 4, Claim 9, Line 23, reads "planned maintenance repair;" and should read --planned maintenance or repair;--

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*